April 14, 1931.  S. J. LONERGAN  1,800,737
SUPPORTING AND ADJUSTING MECHANISM
Filed May 15, 1926   2 Sheets-Sheet 1
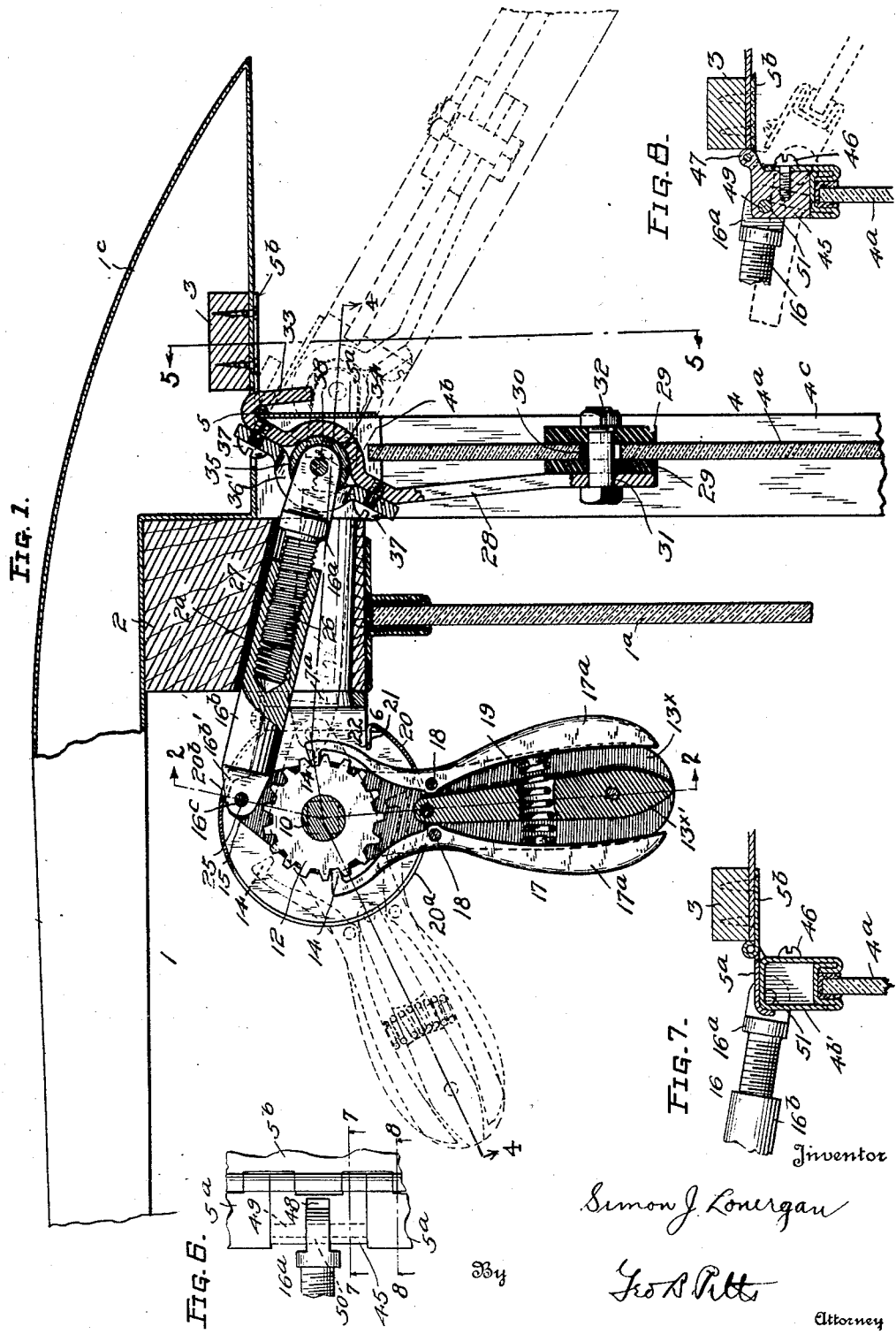
Inventor
Simon J. Lonergan
By
Geo A Pitt
Attorney

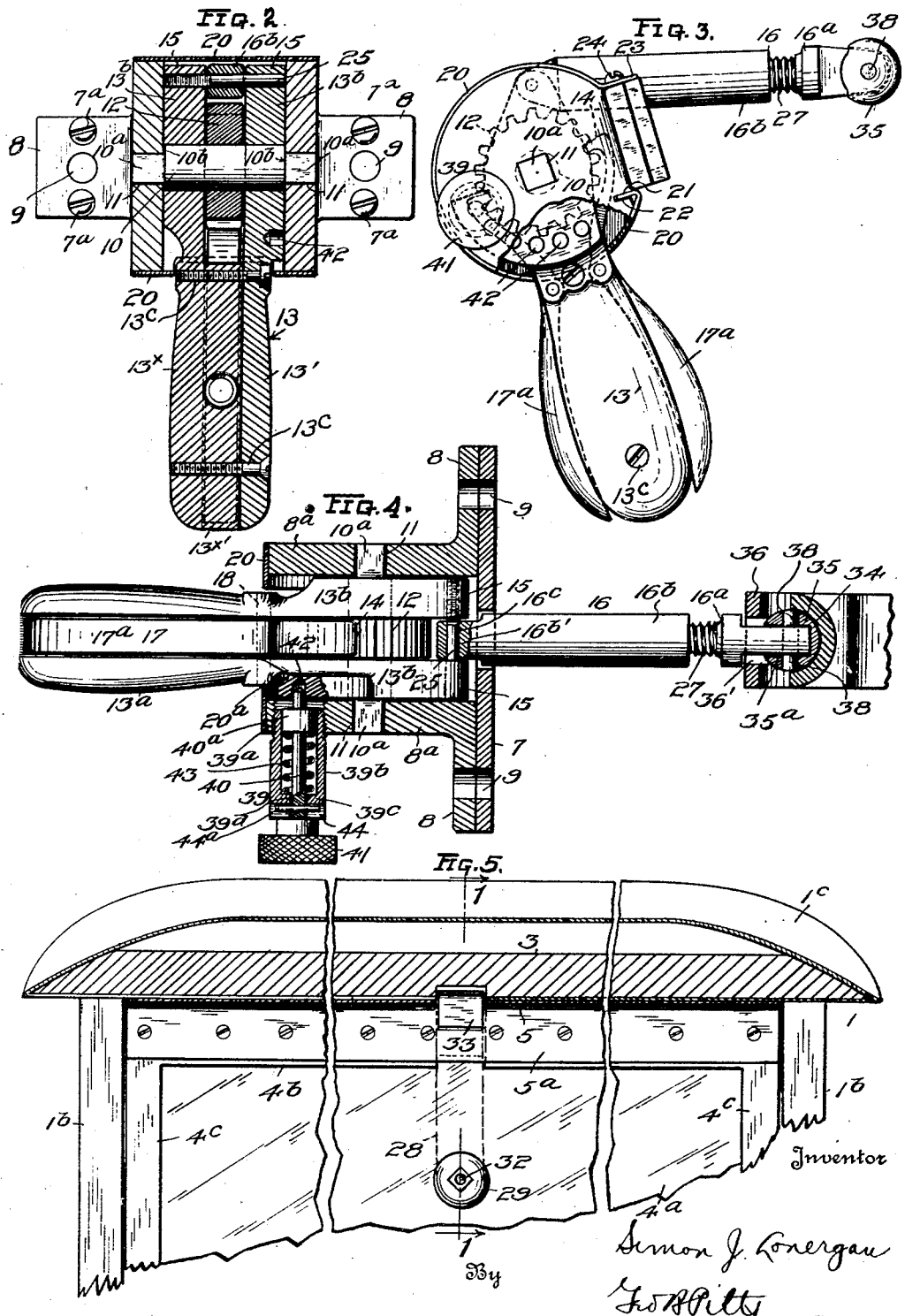

Patented Apr. 14, 1931

1,800,737

UNITED STATES PATENT OFFICE

SIMON J. LONERGAN, OF LA PORTE, INDIANA

SUPPORTING AND ADJUSTING MECHANISM

Application filed May 15, 1926. Serial No. 109,426.

This invention relates to a visor, more particularly to a visor that is adjustable and the mechanism for adjusting and supporting the visor.

One object of the invention is to provide an improved supporting and adjusting mechanism that is relatively simple and easily operated.

Another object of the invention is to provide a mechanism of this character that is operable from within the vehicle.

Another object of the invention is to provide a mechanism of this character that may be readily attached or mounted on the vehicle.

Another object of the invention is to construct a mechanism of this character in which separate means are provided for locking the visor in its adjusted position.

A further object of the invention is to provide an improved connection between the visor and the adjusting elements, whereby operation or adjustment of the visor is easily effected.

Other objects of the invention will be apparent to those skilled in the art to which my invention relates from the following description taken in connection with the accompanying drawings, wherein Fig. 1 is a fragmentary sectional view of a vehicle and a visor therefor, and a supporting and an adjusting mechanism for the visor (being on the line 1—1 of Fig. 5) embodying my invention.

Fig. 2 is a section on the line 2—2 of Fig. 1.

Fig. 3 is a side view with parts broken away.

Fig. 4 is a section on the line 4—4 of Fig. 1.

Fig. 5 is a view on the line 5—5 of Fig. 1.

Fig. 6 is a fragmentary plan view showing a slightly modified form of construction.

Figs. 7 and 8 are sectional views on the lines 7—7 and 8—8, respectively, of Fig. 6.

In the drawings, 1 indicates a vehicle (only a portion thereof being shown) preferably of the closed type, having a windshield 1a disposed between front side pillars 1b and a top or roof 1c, which preferably overhangs the windshield, as shown in Fig. 1. 2, 3, indicate cross members (to be later referred to) forming structural parts of the vehicle 1 and its top 1c. The windshield 1a may consist of one or more sections of glass, and each may be movable for ventilation purposes. In the form of construction chosen for illustration herein, the windshield 1a is adjustable vertically, being slidable in suitable guides on the inner opposing walls of the pillars 1b. It will be understood that the above referred to elements or portions constituting the vehicle structure may be variously constructed and form no part of my present invention.

4 indicates as an entirety a visor, preferably formed of glass that is colored, whereby the light rays from any source are filtered to protect the eyes of the driver as well as to effect or permit vision on his part and efficient operation of the vehicle. The visor 4 preferably comprises a section of glass 4a mounted in a frame consisting of an upper bar 4b and side bars 4c, the former bar being hinged at 5 along its front upper edge to the under-side of the overhanging portion of the top 1c. The bars for the glass 4a may be formed from sheet metal, preferably of hollow form, and grooved to receive the edge of the glass 4a, as shown at 4b' in Fig. 7. As shown in Fig. 5, one part 5a of the hinge is secured to the bar 4b and the other hinge part 5b is secured to said underside portion and the member 3, as shown in Fig. 1. The hinge 5 may be of the piano type and extend from end to end of the bar 4b.

6 indicates as an entirety a supporting and adjusting mechanism arranged to support the visor 4 at any desired position, for example, see dotted lines in Fig. 1, and to move or adjust it to other positions to suit the wishes of the driver. In one position, as shown in full lines in Fig. 1, the visor may be arranged in a vertical position, substantially at right angles to the line of vision, and locked in such position by my improved mechanism 6, and by the release and operation of the latter the visor 4 may be moved to and locked in a substantially horizontal position or any intermediate position.

Of the supporting and adjusting mechanism 6, 7 indicates a base plate to which are rigidly secured—preferably by screws 7a—the feet 8 of spaced supports 8a. The base plate 7 and feet 8 are formed with aligned openings 9 through which the screws or other suitable devices pass to secure the supports 8a in rigid relation to the inner face of the bar 2, within the vehicle 1. As will be understood from Fig. 5, the mechanism 6 is disposed substantially mid-way between the pillars 1b, whereby it is out of the line of vision of the driver and within easy reach either for the driver or any other occupant that may be in the vehicle. 10 indicates a shaft mounted non-rotatively at its opposite ends in the supports 8a. As shown in Figs. 2, 3 and 4, the ends 10a of the shaft are of polygonal shape and fit into correspondingly shaped openings 11 formed in the supports 8a, such construction resulting in the provision of shoulders 10b on the shaft 10 that engage the inner faces of the supports 8a and thus maintain the latter in spaced relation to prevent binding of or friction between the movable elements to be later referred to. 12 indicates a ratchet of curvilinear contour, fixed to the shaft 10 in any desired manner, preferably mid-way between the supports 8a. The rack 12 is preferably an ordinary spur gear or pinion, partly by reason of the fact that it may be readily obtained and partly because it may be assembled on the shaft 10 without regard to its angular position, whereas with a segmental rack, predetermined positions would have to be provided for and skilled mechanics and inspectors required to insure accurate assembly. 13 indicates an operating device having one or more elements 14 which co-act with the rack 12 to effect a locking of the operating device or its release. The operating device 13 comprises a handle 13a provided with bifurcations 13b forming hubs rotatably mounted on the shaft 10 at opposite sides of the rack 12 and having ears 15 to which is pivoted one end of a connection 16 between the operating device 13 and visor 4, as will later be set forth. The operating device 13 is preferably of sectional form, consisting of two members 13', 13x, secured together by screws 13c, the member 13x having a longitudinal wall 13x', to space the bifurcations apart and form recesses for locking and releasing levers 17. The levers 17 are pivoted intermediate their ends on pivots 18 extending transversely across the recesses and mounted in openings formed in the walls of the members 13', 13x. The outer ends of the levers 17 serve as handles whereas their inner ends carry the locking and releasing elements 14, each of which is adapted to fit into a rack space to lock the operating device to the rack and to be released therefrom. 19 indicates means engaging the levers 17 and normally operating to maintain them in locked relation to the rack 12. In the preferred form of construction the means 19 consists of a single coiled spring disposed between and mounted so that its opposite ends bear against the handle portions 17a of the levers 17 so as to normally separate them and thereby normally maintain the locking elements in locking relation with the rack, as shown in Fig. 1. In this form of construction the wall 13x' is formed with an opening 19a so that the opening may pass therethrough and freely operate. As will be understood from Figs. 1 and 3, the spring 19 normally maintains the handle portions 17a of the levers 17 outwardly with respect to the wall 13x' of the handle 13a, so that when the driver grips the handle 13a he also grips both handle portions 17a and by a squeezing operation he may operate the levers to unlock them and then swing the operating device 13 to the desired position; then upon relaxing of his grip the levers automatically become locked to the rack 12 under the influence of the spring 19. It will thus be seen that the operation of unlocking or releasing the operating device 13, its movement to adjust the visor 4 and the locking of the operating device 13 in its adjusted position, may be effected with one hand of the driver and by substantially one movement, since the compression of the driver's hand to compress the lever handles 17a, the movement of the hand or arm to effect the adjustment and the release of the lever handles and incidental to the gripping of the handle 13 to move it and the removal of the hand therefrom.

It will be understood that only one lever 17 and locking element 14 is required to effect the operations and results already referred to, but I prefer to provide and use two levers, since a more positive locking action results and less strain is imparted to the rack, its supporting element—the shaft 10—and the supports 8a for the latter and both levers 17 can be operated and released simultaneously and without additional labor or effort on the part of the driver.

20 indicates a wall for enclosing the hubs 13b and the gear or rack 12. The wall 20 comprises a section of relatively thin sheet metal extending from the lower edges of the feet 8a around the peripheries of the supports 8a (the latter being preferably in the form of disks and slightly larger than the hubs 13b) to the opposite edges of the feet; the first referred to end of the wall 20 being provided with bent over lugs 21 which fit into slots 22 formed in the side walls of the supports 8a and the last referred to end of the wall 20 being provided with a flange 23 that is secured to the feet 8 by screws 24. As will be understood from Figs. 2 and 4, the wall 20 extends across the space between the supports 8a but is formed with an elongated slot 20a to permit the swinging movement of the operating device 13, in the manner already set forth, and with a slot 20b to accommodate the movement of the connection 16, as shown in Fig. 1. For this latter purpose, the base plate 7 is cut away at 7a and the cross member 2 is formed with an opening 2a, when the supporting and adjusting mechanism 6 is mounted as shown in the drawings.

The connection 16 is pivotally connected at its outer end to the visor 4, preferably in the manner to be later set forth. The connection 16 may comprise male and female members 16a, 16b, respectively, the latter at its outer end being provided with a lug 16b' in which is formed an opening 16c to receive a pivot pin 25 supported at its opposite ends in the ears 15. The inner end of the member 16b is formed with a screw threaded opening 26 to receive the threaded shank 27 of the male member 16a (see Fig. 1). The pivot 25 may consist of a pin extending through one ear 15 and the lug 16b' and threaded into the other ear 15, as shown in Fig. 2.

28 indicates an arm having a depending portion disposed rearwardly of the glass 4a and connected thereto at its lower end. This connection of the arm 28 to the visor 4 is preferably at a point remote from its hinge 5, so that the force required to swing or adjust the visor is reduced. The connection may comprise a pair of relatively soft washers 29 upon opposite sides of the glass and in concentric relation to an opening 30 therethrough and an opening 31 formed in the arm 28 and a bolt 32 passing through said openings and the washers and engaging the exposed face of the arm and exposed face of the outer washer to clamp these parts and the visor together in rigid relation. At its upper end, the arm is bent back on itself to form a hook 33 which hangs on the pivot pin or rod of the hinge 5, the plate 5b of the latter and the cross member 3 being cut away to permit of this arrangement and movement of the hook 33. Between the depending portion of the arm 28 and the hook 33, the arm is preferably shaped to form a semi-spherical socket 34 to receive a spherical element 35. The element 35 is secured in the socket 34 by a cap or strap 36 secured at its ends to the arm 28 upon opposite sides of the socket 34 by screws 37. The spherical element 35 is slotted at 35a to receive the outer end of the male member 16a and formed with openings at either side of the slot 35a to receive trunnions 38 by means of which the male member 16a is pivoted to the spherical element 35. As shown in Figs. 1 and 4, the cap 36 is slotted or cut away at 36' to permit unobstructed movement of the member 16a.

By forming the connection 16 of two members 16a, 16b, and adjustably connecting them together the length of the connection may be varied so that the extreme positions of the visor 4 may be changed at will.

39 indicates as an entirety an auxiliary locking means for the operating device 13, preferably interposed between one of the supports 8a and the adjacent hub 13b. Of these means, 39a indicates an opening formed in one of the supports. 39b indicates a tubular member mounted at its inner end in the opening 39a, the wall of the opening and outer wall of the member 39b being provided with screw threads to provide for the rigid mounting of the latter on the support. The outer end of the tubular member 39b is closed by an end wall 39c, but such wall is formed with an opening 39d to slidably and rotatably support the outer end of a plunger or locking pin 40, the inner portion thereof being provided with a collar 40a which slidably and rotatably fits the inner wall of the member 39b. 41 indicates a device, such as an enlarged collar fixed to the outer end of the plunger 40 whereby it may be moved endwise or rotated for purposes to be later set forth. The inner end of the plunger 40 is tapered and is adapted to project into any one of a series of tapered openings or recesses 42 formed in the outer face of the adjacent hub 13b to lock the latter and through it the operating device 13 in any of its adjusted positions. By preference there is one opening or recess for each space formed between the rack teeth, that is, throughout the range of movement of the hubs 13b relative to the gear 12, so that in any position to which the device 13 may be adjusted and locked, it may be locked therein by the auxiliary locking means 39. 43 indicates a spring coiled around the plunger 40 and interposed between the end wall 39c and the collar 40a and normally acting through the latter to move the plunger 40 inwardly and thus yieldingly maintain it in one of the openings 42. To release the plunger 40 from the adjacent opening, the device 41 is grasped and pulled or pushed laterally. As shown at 44, the outer face of the wall 39c is formed with a diametrically extending groove or channel and the plunger carries a laterally extending pin 44a, which fits into this channel when the inner end of the plunger 40 is projected into one of the openings 42, but by moving the plunger outwardly and rotating it to dispose the pin 44a at an angle to the channel 44, the pin will engage the outer face of the wall 39c and thus maintain the plunger 40 in inoperative position, in which position the operating device, upon release of the locking elements 14, may be freely moved in either direction. To actuate the auxiliary lock 39, all that is necessary is to rotate the plunger 40 until the pin 44a is aligned with the channel 44, whereupon the spring 43 will operate the plunger 40 and cause it to project into the adjacent opening 42 and thus interlock the support 8a and hub 13b together.

From the foregoing description it will be seen that the auxiliary locking means may be held in inoperative position at will or brought into operation in a ready and quick manner. When adjustment of the visor 4 is to be made, the auxiliary means is made inoperative; and if frequent adjustments are to be made, it may be held in its inoperative position. Where any adjustment of the visor has once been made and further adjustment will not be necessary for some time, the auxiliary locking means may be operated. The purpose of the auxiliary locking means 39 is to eliminate strain on the locking elements 14 and gear teeth 12 and to reduce the wear on the latter, the effect of which would be to set up a rattle between these parts. By making the free end of the plunger and the openings therefor tapered, danger of vibration is eliminated.

In my construction of adjustment mechanism, the operating device is within the vehicle and its connection with the visor is made in a simple and economical manner. By arranging the locking elements in the plane in which the connection 16 operates and connecting the latter at opposite sides of these elements to the operating device, the connection 16 and through it the visor may be positively and easily operated.

By arranging the gear 12 between the bifurcations 13b, and the latter between the supports 8a and supporting the gear and bifurcations on a shaft that is supported at its ends by these supports 8a, I not only provide a simple construction but one in which the parts may be easily made to fit and move relatively to each other without danger of wobbling or effecting a shearing action on the shaft.

In Figs. 6, 7 and 8, I have illustrated a slightly different form of construction wherein the connection 16 is pivotally connected to the upper bar 4b of the visor 4. In these views, the hinge plate 5b is secured to the cross member 3, whereas the hinge plate 5a is disposed on and secured to the end wall of the bar 4b'. Intermediate its ends, the inner wall and end wall of the bar 4b' are cut away to receive a connecting member 45 which may be secured in such cut away portion by screws 46 and provided with knuckles 47 for the hinge pivot. Between its ends, the member 45 is formed with a slot 48 to receive the outer end of the male member 16a of the connection 16, and also formed with aligned openings 49 through which and an opening 50 formed in the member 16a, extends a pivot pin 51, to pivotally connect the member 16a to the visor 4, whereby the latter may be operated to the position shown in dotted lines in Fig. 8.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:—

1. In mechanism of the class described, the combination with a vehicle having a windshield and a bar disposed above said windshield, and a visor swingable about an axis mounted exteriorly of the vehicle for adjustment relative to said windshield, of a mechanism for adjusting said visor, said mechanism comprising an operating device swingable about an axis mounted within said vehicle upon said bar, a connection between said device and said visor, whereby the swinging of said device about its axis will adjust the visor relative to said windshield, said bar being formed with an opening through which said connection extends, and means for positively locking said device in any position of its adjustment, said means comprising a stationary member having locking elements disposed concentric to the axis on which said device swings and a member pivotally mounted on and movable with said device and arranged to engage and disengage said locking elements.

2. In mechanism of the class described, the combination with a vehicle having a windshield and a visor movably mounted on said vehicle in operative relation to said windshield, of a support carried by the frame of the vehicle, a shaft mounted on said support, a handle freely mounted on said shaft, a connection between said handle and said visor whereby the swinging of said handle about said shaft will adjust the visor relative to said windshield, and locking and releasing means between said handle and said shaft, said means including an element movably mounted on the handle.

3. A mechanism as claimed in claim 2 in which an auxiliary locking means is provided between one of said supports and said handle, comprising mechanism for preventing relative movement between said support and said handle.

4. A mechanism of the class described, the combination with a vehicle having a windshield and a visor movably mounted on said vehicle for movement with respect to said windshield, of a pair of spaced supports on the frame of said vehicle between the sides of said windshield, a shaft non-rotatively supported on said supports, an operating device swingably mounted on said shaft, a connection between said device and said visor, and locking and releasing elements carried by said shaft and said operating device, respectively, and arranged to lock the latter in adjusted position, the element carried by said device being movable in the same plane as said device moves in moving to adjust said visor.

5. A mechanism as claimed in claim 2 in which the locking element on said shaft comprises a rack and the element on said handle comprises a lever, and means are provided for normally maintaining said lever in engagement with said rack.

6. A mechanism as claimed in claim 2 in which the locking element on said shaft comprises a gear and said operating device carries two elements arranged to engage said gear at different points in its circumference, and means are provided for normally maintaining said elements in engagement with said gear.

7. In mechanism of the class described, the combination with a vehicle having a windshield and a visor hinged to the vehicle frame, of an adjustment mechanism for said visor including an operating device, an arm pivoted on the vehicle frame and depending outwardly relative to the hinge for said visor, a connection pivotally connected at its opposite ends to said operating device and said arm, and a connection between the outer portions of said arm and said visor.

8. In mechanism of the class described, the combination with a vehicle having a windshield and a visor hinged to the vehicle frame, of an adjustment mechanism for said visor including an operating device, an arm pivoted on the vehicle frame intermediate the sides of said visor and depending outwardly relative to the hinge for said visor and behind the latter, a connection pivotally connected at its opposite ends to said operating device and said arm, and a connection between the outer portions of said arm and said visor.

9. In mechanism of the class described, the combination with a vehicle having a windshield and a visor movably mounted on said vehicle for movement with respect to said windshield, of a pair of spaced supports on the frame of said vehicle, a shaft non-rotatively supported on said supports, a rack fixed to said shaft, an operating device having bifurcations straddling said rack and swingably mounted on said shaft, a lever carried by said operating device, and arranged to engage said rack to lock said device in adjusted position, and a connection between said one of said bifurcations and said visor.

10. In mechanism of the class described, the combination with a vehicle having a windshield and a visor movably mounted on said vehicle for movement with respect to said windshield, of a pair of spaced supports mounted within said vehicle and above and between the sides of said windshield, a shaft non-rotatively supported on said supports, a rack carried by said shaft, an operating device having bifurcations straddling said rack and swingably mounted on said shaft, a lever carried by said device and arranged to engage said rack to lock said device in adjusted position, and a connection between said device and said visor and extending through an opening in the vehicle, whereby said visor may be adjusted.

11. A mechanism as claimed in claim 10 in which said rack comprises a gear, the operating device is provided with two levers arranged to engage the gear at different points in its circumference and a spring is interposed between said levers and normally operates to maintain them in engagement with said gear.

12. In mechanism of the class described, the combination with a vehicle having a windshield, a visor movably connected to the vehicle for adjustment relative to said windshield, of a mechanism for adjusting said visor, said mechanism comprising a device swingably mounted within said vehicle on the frame thereof, a connection between said device and said visor, means for locking said device in any position of its adjustment, and an auxiliary locking means for locking said device in any position of its adjustment independent from said first mentioned locking means.

13. In mechanism of the class described, the combination with a vehicle having a windshield and a visor, movably mounted on said vehicle in operative relation to said windshield, of a pair of spaced supports carried by the frame of the vehicle, a shaft mounted at its opposite ends on said supports, a handle freely mounted on said shaft between said supports, a connection between said handle and said visor, locking and releasing means between said handle and said shaft whereby adjustment of said visor may be effected, and auxiliary locking means for locking said handle to one of said supports comprising a spring pressed pin mounted on one of said supports and adapted to engage a series of openings in said handle.

14. In mechanism of the class described, in combination with a vehicle having a windshield and a visor movably mounted on the vehicle in operative relation to the windshield, of a support carried by the frame of the vehicle, a shaft mounted on said support, a handle freely mounted on said shaft, a connection between said handle and the visor, locking and releasing means between said handle and said shaft whereby adjustment of said visor may be effected, auxiliary locking means between said handle and said support, and means for holding said auxiliary locking means in an inoperative position.

In testimony whereof, I have hereunto subscribed my name.

SIMON J. LONERGAN.